(12) United States Patent
Kuo

(10) Patent No.: US 7,433,009 B2
(45) Date of Patent: Oct. 7, 2008

(54) ARRAY SUBSTRATE OF THIN FILM TRANSISTOR LIQUID CRYSTAL DISPLAY AND METHOD FOR FABRICATING THE SAME

(75) Inventor: Chien-Chung Kuo, Feng Yuan (TW)

(73) Assignee: Wintek Corporation, Taichung (TW)

(*) Notice: Subject to any disclaimer, the term of this patent is extended or adjusted under 35 U.S.C. 154(b) by 286 days.

(21) Appl. No.: 11/489,486

(22) Filed: Jul. 20, 2006

(65) Prior Publication Data

US 2008/0018817 A1      Jan. 24, 2008

(51) Int. Cl.
*G02F 1/1345* (2006.01)

(52) U.S. Cl. .................. 349/152; 349/149; 349/151

(58) Field of Classification Search .................. 349/152
See application file for complete search history.

(56) References Cited

U.S. PATENT DOCUMENTS

| 5,347,379 A * | 9/1994 | Kawagishi et al. ............ 349/52 |
| 6,396,554 B1 * | 5/2002 | Matsuda .................... 349/139 |
| 6,724,443 B1 * | 4/2004 | Sano et al. .................... 349/39 |
| 6,937,314 B2 * | 8/2005 | Kim .......................... 349/149 |
| 2003/0164501 A1 * | 9/2003 | Suzuki et al. .................. 257/72 |
| 2006/0244893 A1 * | 11/2006 | Oda .......................... 349/151 |
| 2007/0076136 A1 * | 4/2007 | Matsuda ........................ 349/43 |

* cited by examiner

*Primary Examiner*—Frank G. Font
*Assistant Examiner*—Mary A El Shammaa
(74) *Attorney, Agent, or Firm*—Muncy, Geissler, Olds & Lowe PLLC

(57) ABSTRACT

An array substrate of a TFT-LCD includes a transparent substrate, a buffer layer, an active-matrix drive circuitry, a passivation layer, and a pixel electrode. The buffer layer is formed on the transparent substrate and includes a first buffer section and a second buffer section in each pixel region. The first buffer section is over-etched and thus has a thickness smaller than that of the second buffer section. The active-matrix drive circuitry is provided on each second buffer section for addressing a pixel of the TFT LCD, and the passivation layer having at least one contact hole in each pixel region is formed overlying the active-matrix drive circuitry. The pixel electrode is formed on each first buffer section and connected to the active-matrix drive circuitry through the contact hole.

6 Claims, 3 Drawing Sheets

ARRAY SUBSTRATE OF THIN FILM TRANSISTOR LIQUID CRYSTAL DISPLAY AND METHOD FOR FABRICATING THE SAME

BACKGROUND OF THE INVENTION (a) Field of the Invention

The invention relates to an array substrate of a thin film transistor liquid crystal display (TFT-LCD) and a method for fabricating the array substrate of the TFT-LCD.

(b) Description of the Related Art

Nowadays, a thin film transistor liquid crystal display (TFT-LCD) that incorporates active-matrix addressing technology has gone mainstream because of its low power consumption, high resolution, and swift response. Moreover, the fabrication of an amorphous silicon thin-film transistor (a-Si TFT), among all kinds of thin-film transistors, becomes dominant in the active-matrix addressing technology.

The configurations of an a-Si TFT are mainly classified as four types including the following: 1. normal coplanar, 2. inverted coplanar, 3. normal staggered, and 4. inverted staggered. Though each type of TFT configurations may have its own design features and suitable application, the inverted staggered configuration is more widely used in a-Si TFT fabrication.

In the fabrication of a TFT LCD, an array substrate is first provided on which a TFT matrix is formed through repetitive semiconductor processes such as film deposition, lithography, and etching to result in specific circuit operations. Then, liquid crystal materials are injected in the gap formed between the array substrate and a color filter substrate arranged parallel to the array substrate, and they together form a TFT LCD panel. Finally, the TFT LCD panel and other devices such as a driver IC, a circuit board, and a backlight are put together in a chassis and assembled into a finished product.

However, during the fabrication of an a-Si TFT LCD, some dust particles suspended in the air of the fabrication environment may fall on the array substrate. In that case, once an amorphous silicon layer is deposited on the array substrate, amorphous silicon materials may enclose the dust particles to form many tiny protrusions referred to as amorphous silicon particles, which are seldom completely removed by subsequent etching processes. Thus, the residual amorphous silicon particles, which are hardly ever detected compared to common particles, may result in a potentially serious defect of an a-Si TFT LCD. Particularly, when the amorphous silicon particles leave residues on the active areas (light-transmitting areas) of the array substrate, a weak capacitance coupling effect may occur between the residues and a pixel electrode to considerably decrease the production yield of an a-Si TFT LCD.

BRIEF SUMMARY OF THE INVENTION

Hence, an object of the invention is to provide an array substrate of a thin film transistor liquid crystal display (TFT-LCD) that has almost no residual amorphous silicon particles on its active areas.

Another object of the invention is to provide a method for fabricating an array substrate that is capable of eliminating residual amorphous silicon particles to improve the production yield of an amorphous silicon thin-film transistor liquid crystal display.

According to the invention, an array substrate of a TFT-LCD includes a transparent substrate, a buffer layer, an active-matrix drive circuitry, a passivation layer, and a pixel electrode. The buffer layer is formed on the transparent substrate and includes a first buffer section and a second buffer section in each pixel region. The first buffer section is over-etched and thus has a thickness smaller than that of the second buffer section. The active-matrix drive circuitry is provided on each second buffer section for addressing a pixel of the TFT LCD, and the passivation layer having at least one contact hole in each pixel region is formed overlying the active-matrix drive circuitry. The pixel electrode is formed on each first buffer section and connected to the active-matrix drive circuitry through the contact hole.

Through the design of the invention, since the first buffer section of the buffer layer is over-etched in the process by which the passivation layer having contact holes is defined, the top portion of the first buffer section on which the residual amorphous silicon particles left are removed. Thus, residual amorphous silicon particles on the active areas of an array substrate are eliminated, and a weak capacitance coupling effect induced in the active areas of the array substrate is avoided to result in an improved production yield of an a-Si TFT LCD.

DETAILED DESCRIPTION OF THE INVENTION

Figure 1:
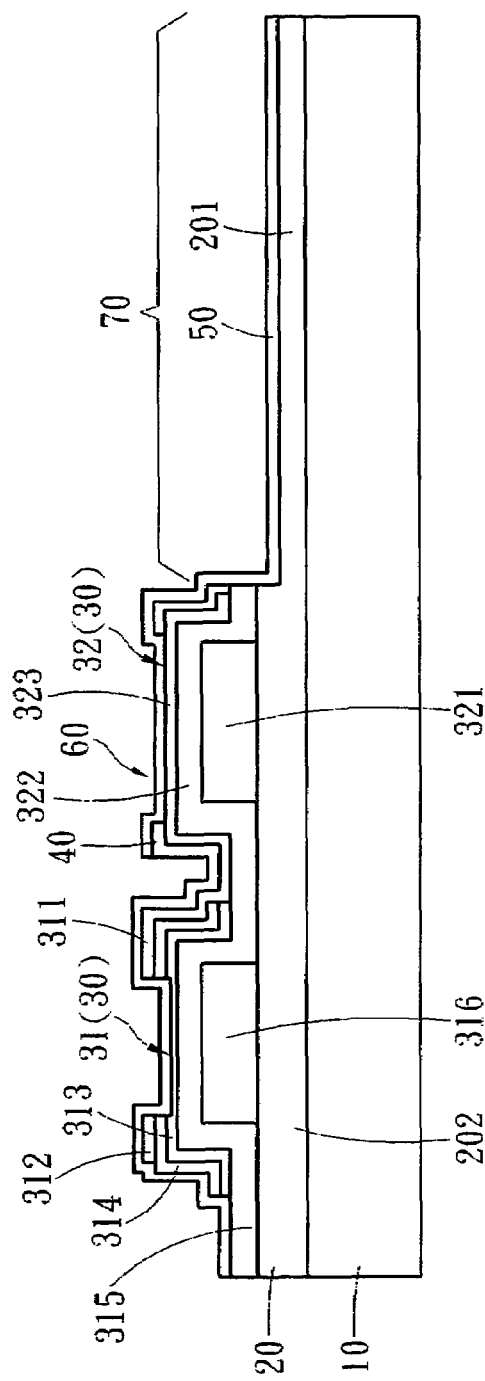
FIG. 1 shows a cross-section illustrating an array substrate of an amorphous silicon thin film transistor liquid crystal display according to an embodiment of the invention.

FIG. 1 shows a cross-section illustrating an array substrate of an amorphous silicon thin film transistor liquid crystal display (a-Si TFT LCD) according to an embodiment of the invention. On the array substrate a plurality of pixel regions, each of which is spread with a pixel of the a-Si TFT LCD, are defined. Further, since different pixels of the a-Si TFT LCD have identical structures, FIG. 1 illustrates only a part of the array substrate equal to the span of one pixel region.

Referring to FIG. 1, a buffer layer 20, which is formed on an entire surface of the transparent substrate 10, includes a first buffer section 201 and a second buffer section 202 in one pixel region, with the first buffer section 201 having a thickness smaller than that of the second buffer section 202. The first buffer section 201 entirely overlaps the active areas 70 (light-transmitting areas) of an array substrate, while the second buffer section 202 overlaps the remainder areas of the array substrate. Further, the buffer layer 20 is made from silicon nitride (SiNx), silicon oxide (SiOx), or silicon oxide-nitride (SiONx).

An active-matrix drive circuitry 30, in a form of stack layers, is provided on each second buffer section 202. The active-matrix drive circuitry 30 includes at last one transistor 31 and at least one storage capacitor 32. In this embodiment, each transistor 31 shown in FIG. 1 is exemplified as having an inverted staggered configuration, which includes a drain electrode 311, a source electrode 312, an active layer 313 (pure amorphous silicon (a-Si:H)), an ohmic contact layer 314 (doped amorphous silicon (n+ a-Si:H)), a gate insulation layer 315, and a gate electrode 316. However, this is not limited, and other types of TFT configurations such as normal coplanar, inverted coplanar and normal staggered may also be used in the invention. Each storage capacitor 32 is constructed by a bottom electrode 321, a top electrode 323, and a dielectric layer 322 sandwiched between them. Further, the top electrode 323 is in connection with the drain electrode 311, and the dielectric layer 322 of the storage capacitor 32 is formed from the same layer as the gate insulation layer 315 under the same fabrication process.

A passivation layer 40 is formed overlying the active-matrix drive circuitry 30, and a portion of the passivation layer 40 is removed to expose a portion of the active-matrix drive circuitry 30 serving as an electrical contact so as to form a contact hole 60 in each pixel region.

During the formation of the contact holes 60 of the passivation layer 40, the same etching process is also performed in the active areas 70 of the array substrate to the extent that the first buffer section is over-etched for certain thickness. Thus, the thickness of the first buffer section 201 is smaller compared to the second buffer section 202. Thereafter, a pixel electrode 50 is formed on each first buffer section 201 and extended to cover each contact hole 60. Also, the pixel electrode 50 is connected to the active-matrix drive circuitry 30 through the contact hole 60. Hence, since the first buffer section 201 is over-etched, the amorphous silicon particles left in the active areas 70 of the array substrate are eliminated to avoid the occurrence of a weak capacitance coupling effect induced in the active areas 70, and the production yield of an a-Si TFT LCD is improved as a result.

FIGS. 2A-2E depict cross-sectionally an array substrate following the process steps of an embodiment used in fabricating the array substrate.

Figure 2A:
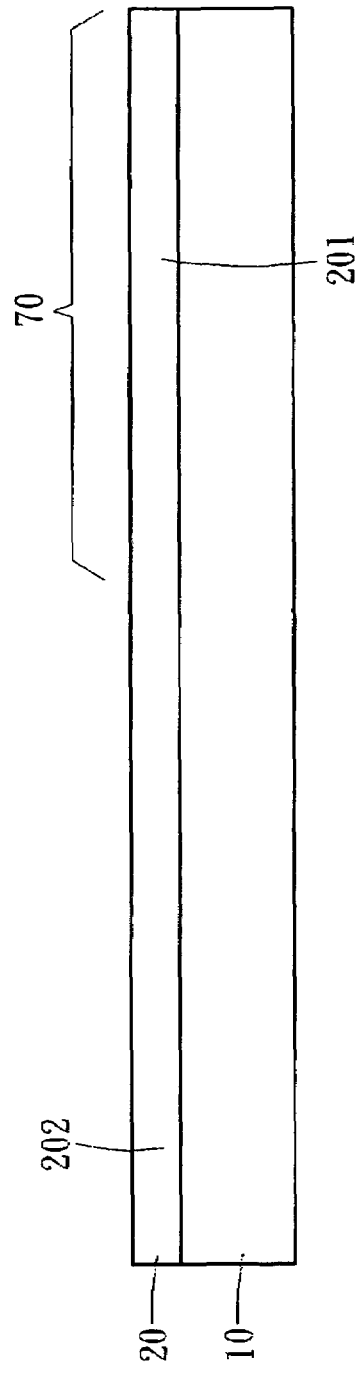
FIGS. 2A-2E depict cross-sectionally an array substrate following the process steps of an embodiment used in fabricating the array substrate.

Referring to FIG. 2A, a buffer layer 20 is formed on the transparent substrate 10 through thin film deposition such as chemical vapor deposition, and the buffer layer 20 is made from silicon nitride (SiNx), silicon oxide (SiOx), or silicon oxide-nitride (SiONx). The buffer layer 20 in one pixel region is divided as a first buffer section 201 and a second buffer section 202. The first buffer section 201 entirely overlaps the active areas 70 (light-transmitting areas) of an array substrate, while the second buffer section 202 overlaps the remainder areas of the array substrate.

Figure 2B:
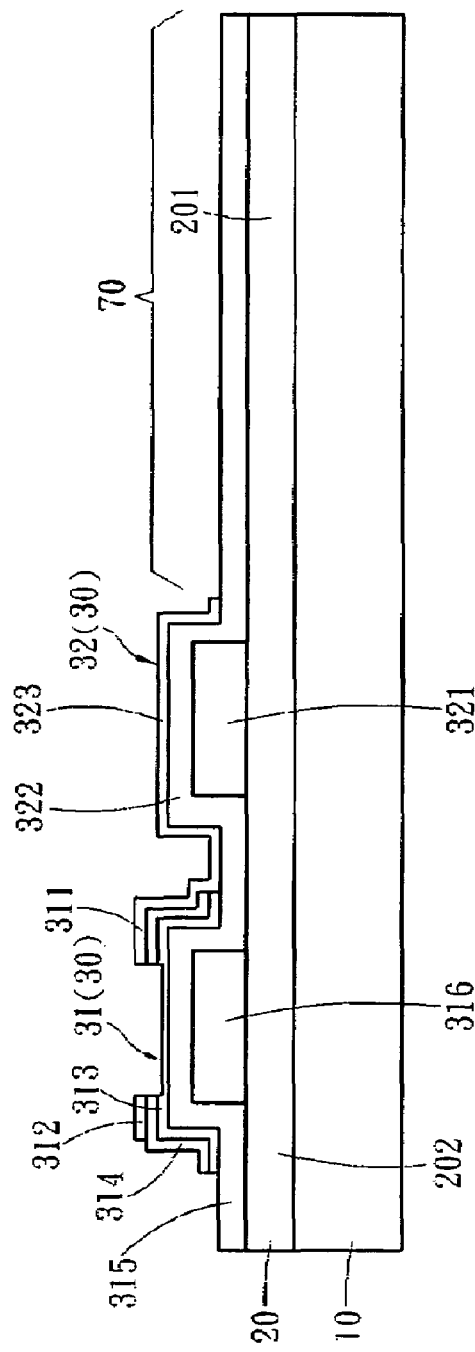

Then, as shown in FIG. 2B, an active-matrix drive circuitry 30 that includes at least one transistor 31 and at least one storage capacitor 32 is formed on the buffer layer 20. In this embodiment, each transistor 31 of the active-matrix drive circuitry 30 is exemplified as having an inverted staggered configuration, which includes a drain electrode 311, a source electrode 312, an active layer 313 (pure amorphous silicon (a-Si:H)), an ohmic contact layer 314 (a doped amorphous silicon (n+ a-Si:H)), a gate insulation layer 315, and a gate electrode 316. However, this is not limited, and other types of TFT configurations such as normal coplanar, inverted coplanar and normal staggered may also be used in the invention. Each storage capacitor 32 is constructed by a bottom electrode 321, a top electrode 323, and a dielectric layer 322 sandwiched between them. Further, the top electrode 323 is in connection with the drain electrode 311, and the dielectric layer 322 of the storage capacitor 32 is formed from the same layer as the gate insulation layer 315 under the same fabrication process.

Figure 2C:
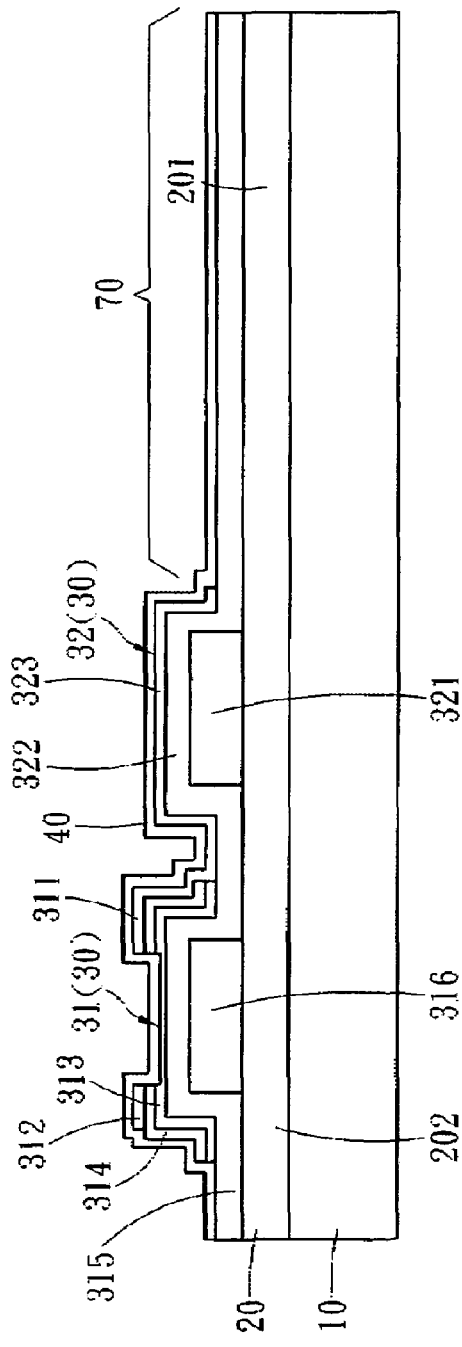
Figure 2D:
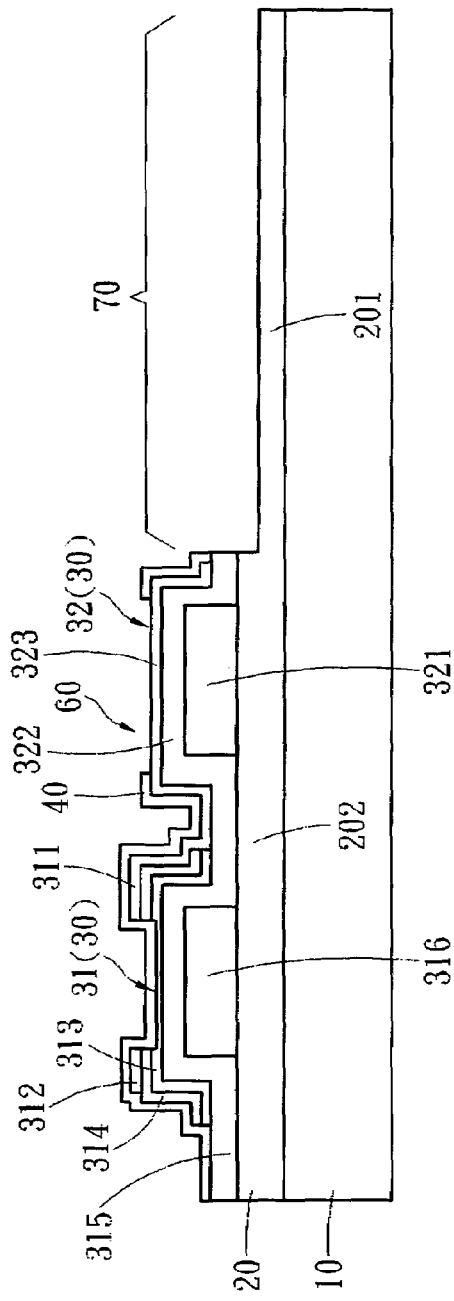

In FIG. 2C, a passivation layer 40 that protects the active-matrix drive circuitry 30 is formed overlying the buffer layer 20 and the active-matrix drive circuitry 30 by thin film deposition. Then, a photo resist (not shown) is formed on the passivation layer 40 and then exposed to light, and the array substrate is put into an etching chamber (not shown) in order to form at least one contact hole 60 in each pixel region shown in FIG. 2D. Namely, the passivation layer 40 is patterned and a portion of it is removed to form the contact hole 60.

During the formation of the contact holes 60 of the passivation layer 40, the same etching process is also performed in the active areas 70 of the array substrate to the extent that the first buffer section 201 is over-etched for certain thickness. Hence, the residue amorphous silicon particles left on the surface of the first buffer section 201 are eliminated since a top portion of the first buffer section 201 is removed due to over-etching.

Figure 2E:
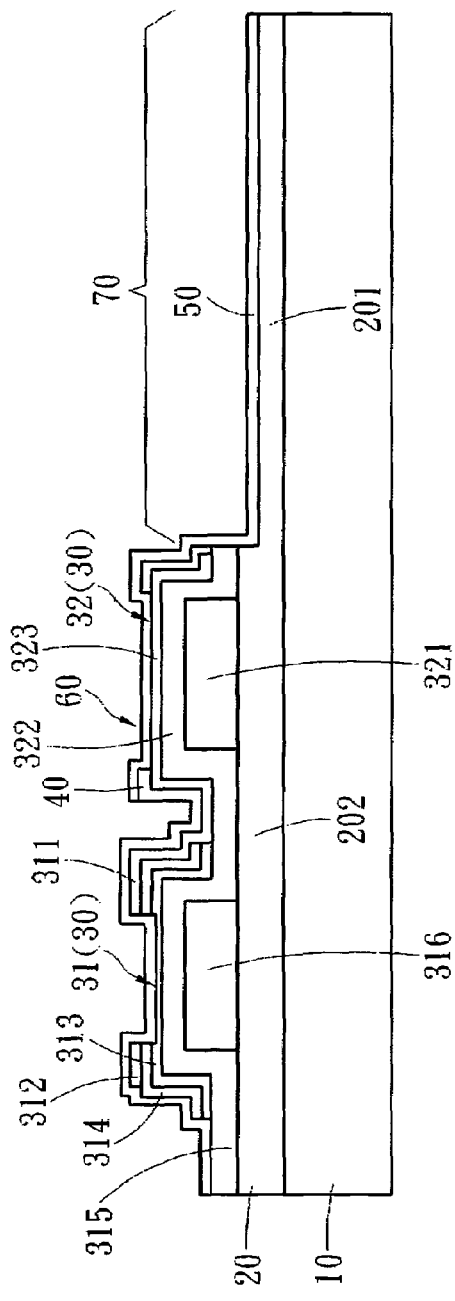

Thereafter, as shown in FIG. 2E, a pixel electrode 50 is formed on each first buffer section 201 and extended to cover the contact hole 60; also, the pixel electrode 50 is connected to the active-matrix drive circuitry 30 through the contact hole 60. The pixel electrode 50 is formed by a thin film fabrication process such as sputter coating.

Through the design of the invention, since the first buffer section 201 of the buffer layer 20 is over-etched in the process by which the passivation layer 40 having contact holes 60 is defined, the top portion of the first buffer section 201 on which the residual amorphous silicon particles left are removed. Thus, a weak capacitance coupling effect induced in the active areas of the array substrate is avoided, and the production yield of an a-Si TFT LCD is improved as a result.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An array substrate of a thin film transistor liquid crystal display (TFT LCD) where a plurality of pixel regions each spread with a pixel of the TFT LCD are defined, the array substrate comprising:
    a transparent substrate;
    a buffer layer formed on the transparent substrate, the buffer layer comprising a first buffer section and a second buffer section in each pixel region, with the first buffer section having a thickness smaller than that of the second buffer section;
    an active-matrix drive circuitry provided on each of the second buffer section for addressing a pixel of the TFT LCD;
    a passivation layer formed overlying the active-matrix drive circuitry and having at least one contact hole in each pixel region; and
    a pixel electrode formed on each of the first buffer section and extended to cover the contact hole of the passivation layer, the pixel electrode being connected to the active-matrix drive circuitry through the contact hole.

2. The array substrate as claimed in claim 1, wherein the active-matrix drive circuitry comprises at least one transistor and storage capacitor.

3. The array substrate as claimed in claim 1, wherein the buffer layer is made from silicon nitride (SiNx), silicon oxide (SiOx), or silicon oxide-nitride (SiONx).

4. A method for fabricating an array substrate of a thin film transistor liquid crystal display where a plurality of pixel regions each spread with a pixel of the TFT LCD are defined, the method comprising the steps of:
    providing a transparent substrate;
    forming a buffer layer on an entire surface of the transparent substrate;

providing an active-matrix drive circuitry on the buffer layer and in each pixel region;

forming a passivation layer on the buffer layer to cover the active-matrix drive circuitry;

patterning the passivation layer to form at least one contact hole in each pixel region;

over-etching a portion of the buffer layer that overlaps active areas of the array substrate; and forming a pixel electrode overlying the over-etched portion of the buffer layer and the contact hole, where the pixel electrode is connected to the active-matrix drive circuitry through the contact hole.

5. The fabrication method as claimed in claim 4, wherein the active-matrix drive circuitry comprises at least one transistor and storage capacitor.

6. The fabrication method as claimed in claim 4, wherein the buffer layer is made from silicon nitride (SiNx), silicon oxide (SiOx), or silicon oxide-nitride (SiONx).

* * * * *